US006647021B1

United States Patent
Appanna et al.

(10) Patent No.: US 6,647,021 B1
(45) Date of Patent: Nov. 11, 2003

(54) ASYMMETRICAL DIGITAL SUBSCRIBER LINE (ADSL) UPSTREAM SUBSCRIBER BUS INTERFACE (SBI) PROTOCOL

(75) Inventors: Prakash Appanna, Santa Rosa, CA (US); Tony Huang, Novato, CA (US); Hamid Baradaran, Novato, CA (US); Hans Christian Mogensen, Santa Rosa, CA (US); Jim Lotz, Napa, CA (US); Tom Koai, Fremont, CA (US); Jensheng Lee, Petaluma, CA (US)

(73) Assignee: Alcatel USA Sourcing, L.P., Plano, TX (US)

( * ) Notice: Subject to any disclaimer, the term of this patent is extended or adjusted under 35 U.S.C. 154(b) by 0 days.

(21) Appl. No.: 09/201,675

(22) Filed: Nov. 30, 1998

(51) Int. Cl.[7] ............................................. H04L 12/40
(52) U.S. Cl. ........................ 370/438; 370/458; 370/236
(58) Field of Search ............................. 370/264, 351.3, 370/359, 389, 402, 419, 431, 438, 442, 458, 463, 489, 498, 503, 509, 522, 229, 230, 231, 235, 236; 710/100–105, 107, 126, 129

(56) References Cited

U.S. PATENT DOCUMENTS

| 5,434,854 | A | * | 7/1995 | Focarile et al. ............. 370/335 |
| 5,534,912 | A | | 7/1996 | Kostreski ...................... 348/6 |
| 5,544,170 | A | * | 8/1996 | Kasahara .................... 370/253 |
| 5,570,355 | A | * | 10/1996 | Dail et al. .................. 370/352 |
| 5,608,447 | A | | 3/1997 | Farry et al. .................... 348/7 |
| 5,617,419 | A | | 4/1997 | Christensen et al. ........ 370/471 |
| 5,623,491 | A | | 4/1997 | Skoog ........................ 370/397 |
| 5,704,047 | A | | 12/1997 | Schneeberger ......... 395/200.65 |
| 5,712,853 | A | | 1/1998 | Mathur et al. .............. 370/467 |
| 5,732,082 | A | | 3/1998 | Wartski et al. .............. 370/395 |
| 5,737,333 | A | | 4/1998 | Civanlar et al. ............. 370/352 |
| 5,737,334 | A | | 4/1998 | Prince et al. ................ 370/395 |
| 5,737,337 | A | | 4/1998 | Voith et al. .................. 371/2.2 |
| 5,809,021 | A | * | 9/1998 | Diaz et al. .................. 370/364 |
| 5,889,773 | A | * | 3/1999 | Stevenson, III ............. 370/352 |
| 5,999,518 | A | * | 12/1999 | Nattkemper et al. ........ 370/258 |
| 6,005,865 | A | * | 12/1999 | Lewis et al. ................. 370/398 |
| 6,023,465 | A | * | 2/2000 | Brueckheimer et al. ..... 370/386 |
| 6,049,541 | A | * | 4/2000 | Kerns et al. ................. 370/365 |
| 6,154,460 | A | * | 11/2000 | Kerns et al. ................. 370/398 |
| 6,452,944 | B1 | * | 9/2002 | Appanna et al. ............ 370/471 |

* cited by examiner

*Primary Examiner*—David Vincent
(74) *Attorney, Agent, or Firm*—V. Lawrence Sewell

(57) ABSTRACT

Asymmetrical digital subscriber line (ADSL) upstream subscriber bus interface (SBI) protocol provides a SBI frame format which allows compatibility between an ADSL line card and either an ADSL bank control unit (ABCU) or a conventional narrowband bank control unit (BCU), and compatibility between a conventional plain old telephone service (POTS) line card and either the ABCU or the conventional narrowband BCU.

36 Claims, 3 Drawing Sheets

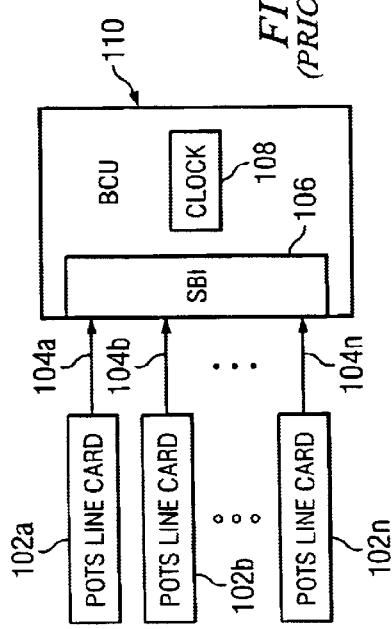

ASYMMETRICAL DIGITAL SUBSCRIBER LINE (ADSL) UPSTREAM SUBSCRIBER BUS INTERFACE (SBI) PROTOCOL

BACKGROUND OF THE INVENTION

1. Field of the Invention

The present invention relates to an interface protocol for digital communications, and more particularly, to an interface protocol for an asymmetrical digital subscriber line (ADSL) subscriber bus interface (SBI).

2. Background

The telecommunications industry has developed schemes for transmitting telephony signals in digital formats, for example, in the form of time division multiplexed (TDM) signals for transmission over a physical layer interface, such as a subscriber bus interface (SBI). The SBI receives data signals divided into frames. Each SBI frame includes time slots which are assigned payload data representing digitized telephony signals for conventional telephone services.

An example of a conventional telephone service is a plain old telephone service (POTS), which uses a digital format that is known to a person skilled in the art. An example of an SBI frame format for upstream transmission used in Litespan line cards made by DSC corporation of Plano, Tex. is shown in FIG. 1. The SBI frame format of FIG. 1 includes 32 time slots numbered consecutively from 0 to 31. Each of the slots within the conventional SBI frame includes 16 bits. As shown in FIG. 1, for time slot #0, abbreviated as "TS0", bits are interleaved with reserved bits denoted by "R", which are not assigned to carry information in the upstream SBI protocol.

POTS digital signal 0 bytes, abbreviated as "DS0", are assigned to time slots #1–3, 5–15, 17–23, and 25–31 within the SBI frame. Each of the DS0 signals has a format similar to that of the TS0 cell. Each DS0 byte includes 8 bits which are interleaved with eight reserved bits similar to the interleaving of the TS0 byte with the eight reserved bits within time slot #0 as shown in FIG. 1.

In the SBI frame as shown in FIG. 1, time slot #4 is assigned to carry a "SIG" byte which identifies a signaling channel. The SIG byte in time slot #4 is required in the conventional SBI protocol and is known to a person skilled in the art. Time slot #16 is assigned a "SRQ" byte which identifies a SBI service request channel. The SRQ byte in time slot #16 is required in the SBI communication protocol and is known to a person skilled in the art. Time slot #24 includes an SBI data link channel which is abbreviated as "DL" in FIG. 1. The DL byte in time slot #24 which is assigned to carry the SBI data link channel is required in the SBI communication protocol and is known to a person skilled in the art.

FIG. 2 shows a diagram of a conventional POTS channel bank where POTS line cards 102a, 102b, . . . 102n are connected to the backplane conventional bank control unit (BCU) 110 through a backplane interface such as a conventional SBI 106. In the conventional POTS SBI channel bank, each of the line cards 102a, 102b, . . . 102n is capable of supporting up to 24 conventional POTS DS0 channels and 4 conventional POTS control channels. A DS0 channel is 64 kilobits per second (kbps) digital channel each having a transmission rate of 8,000 bytes per second, each byte including 8 bits. Each of the DS0 channels supports one conventional POTS interface or its equivalent. SBI 106, which is on the backplane of the BCU 110, allows the BCU to process upstream DS0 signals from one or more POTS line cards 102a, 102b, . . . 102n. A conventional SBI channel bank system is capable of carrying upstream and downstream traffic separately, with the upstream traffic defined as transmission in the direction from one of the POTS line cards 102a, 102b, . . . 102n to the BCU 110, and the downstream traffic defined as transmission in the direction from the BCU to the POTS line card. The direction of the upstream traffic is indicated by arrows 104a, 104b, . . . 104n leading from the POTS line cards 102a, 102b, . . . 102n to the BCU 110, respectively.

For the upstream traffic, each of the line cards 102a, 102b, . . . 102n has a serial backplane traced to the BCU 110 through the SBI 106, which is physically provided on the backplane of the BCU 110. The conventional SBI frame format allows each of the line cards 102a, 102b, . . . 102n to support 32 channels each capable of providing a transmission rate of 64 kbps. The 32 channels may include 24 conventional DS0 channels, 4 control channels, 2 data link channels, a framing channel and a reserved channel. The DS0 channels, the control channels, the data link channel, the framing channel and the reserved channel are multiplexed in the time domain by using a conventional time division multiplexing (TDM) technique, which is known to a person skilled in the art. A clock 108 is provided for the BCU 110 and operates at a clock rate of 4.096 MHZ. In the conventional POTS SBI channel bank system, every other bit time on the clock 108 is unused, thereby producing an affective data rate of 2.048 MHZ, which is one half of the clock rate of 4.096 MHZ, on the backplane trace of the BCU 110. The effective data rate of 2.048 MHZ is sufficient to support 32 time slots, with each time slot sufficient for supporting a conventional 64 kbps channel. As shown in FIG. 1, a conventional SBI frame which has a duration of 125 µs is long enough to carry one 8-byte per SBI time slot for each of the 32 channels each having a data rate of 64 kbps.

Broadband traffic of data in an asynchronous transfer mode (ATM) format is carried by conventional asymmetrical digital subscriber lines (ADSL). The ATM data are transmitted in the form of ATM cells assigned to the respective time slots in the SBI frames, each frame having a duration of 125 µs. The transmission of the ATM cells over the ADSL is called "ATM over ADSL." Examples of digital signals which are carried in the ATM format include digital video signals and computer data signals. On the other hand, telephony signals are usually carried over the conventional DS0 channels which are time division multiplexed and assigned to the SBI time slots according to the SBI frame format as shown in FIG. 1. It is desirable to be able to transmit the conventional POTS DS0 channels and the ATM data within the same SBI frame. It is also desirable to be able to convey both ATM and POTS traffic over existing conventional channel bank backplanes.

However, the conventional SBI frame format as shown in FIG. 1 and described above is not capable of supporting both the POTS DS0 channels and the broadband ATM traffic with a desirable data rate, when each bit in the DS0 cells is interleaved with a reserved bit. Therefore, there is a need for an upstream subscriber bus interface protocol which allows an SBI frame to carry both POTS and ATM traffic. Furthermore, there is a need for an upstream SBI data format which allows an SBI frame to be processed by either a conventional narrowband BCU or a broadband ADSL bank control unit (ABCU). There is yet a further need for an upstream SBI protocol which allows mixed connections between the line cards and the control unit, for example, a mixed connection between a conventional POTS line card and a broadband ABCU, or a mixed connection between an ADSL line card and a conventional narrowband BCU.

SUMMARY OF THE INVENTION

The present invention satisfies these needs. In accordance with the present invention, a method of formatting an SBI frame comprises the steps of:

assigning asynchronous transfer mode (ATM) payload bytes to some SBI time slots within the SBI frame; and assigning plain old telephone service (POTS) digital signal bytes to some of the SBI time slots within the SBI frame, wherein the SBI frame is configured for transmission from a line card selected from the group including an asymmetrical digital subscriber line (ADSL) line card and a POTS line card to a control unit selected from the group including an ADSL bank control unit (ABCU) and a narrowband bank control unit (BCU).

In one embodiment, the SBI frame includes an overhead byte. The control unit may receive upstream POTS and ATM bytes from different ports of a line card. The overhead byte includes back pressure indicator (BPI) bits for signifying to the control unit whether to enable or to disable downstream transmission on one of the channels from the control unit to one of the ADSL ports on the line card when the line card is an ADSL line card and the control unit is an ABCU. Each of the BPI bits may be assigned either "0" for disabling the downstream transmission within the respective channel or "1" for enabling the downstream transmission. The overhead byte may further include port identifier bits for identifying the port number of each port on the line card. The overhead byte may further include cell type indicator bits for indicating the type of cells in the SBI frame.

In a further embodiment, the method of the present invention comprises the additional steps of assigning an ADSL identification tag (AIT) byte to the SBI frame for identifying whether the line card is an ADSL line card and transmitting the AIT byte from the line card to the control unit. Furthermore, the AIT byte and the overhead byte may be assigned to the same time slot, such as SBI time slot #0, which is the first time slot within the SBI frame.

In another embodiment, the SBI frame according to the present invention includes a plurality of ATM header bytes, each of which is bit interleaved with a respective one of the POTS digital signal bytes within a respective one of the SBI time slots.

Furthermore, ATM header bytes may be assigned to a first plurality of the time slots, each of which includes, in addition to a respective one of the ATM header bytes, one of the POTS digital signal bytes. Each ATM header byte may be bit interleaved with a respective one of the POTS digital signal bytes within each of the first plurality of the time slots before the SBI frame is transmitted from the line card to the control unit.

Furthermore, in the embodiment in which the BPI bits are provided in the SBI frame for the upstream transmission from an ADSL line card to the control unit, and the BPI bits may be transmitted twice within each SBI frame to signify to the control unit whether to enable or to disable downstream transmission from the control unit to the line card. The BPI bits may be transmitted as part of the overhead byte within the first time slot, that is, time slot #0, and transmitted again within a time slot in the middle of the SBI frame, such as time slot #16.

Thus, with the present invention, both the conventional narrowband digital signal channels of a conventional POTS system and the wide band ATM payload data may be included within a single SBI frame for upstream transmission from a line card to a control unit. The present invention allows the reserved bits within the SBI time slots of a conventional SBI channel bank system to be utilized efficiently, thereby producing an effective data transmission rate twice that of the conventional SBI channel bank system without increasing the clock rate.

Further, with the present invention, compatibility between conventional narrowband line cards and a broadband ADSL bank control unit (ABCU), and between broadband ADSL line cards and the conventional narrowband bank control unit (BCU) can be obtained. Further with the present invention, the control unit which may be either an ABCU or a BCU, and can be connected to a mixture of POTS line cards and ADSL line cards, thereby solving the problem of compatibility between the SBI formats of ATM over ADSL and conventional POTS channels.

BRIEF DESCRIPTION OF THE DRAWINGS

The present invention will be described with respect to particular embodiments thereof, and references will be made to the drawings in which:

FIG. 1 is a diagram illustrating time slots in, a conventional subscriber bus interface (SBI) frame;

FIG. 2 is a simplified block diagram illustrating upstream transmission of the conventional SBI frame of FIG. 1 from conventional plain old telephone service (POTS) line cards to a conventional narrowband bank control unit (BCU);

FIG. 3 is a diagram illustrating an embodiment of bit mapping of an overhead byte within the SBI frame in accordance with the present invention;

FIG. 5 is a diagram illustrating an embodiment of bit mapping of a back pressure indicator (BPI) byte within the SBI frame in accordance with the present invention;

DETAILED DESCRIPTION

Figure 4:
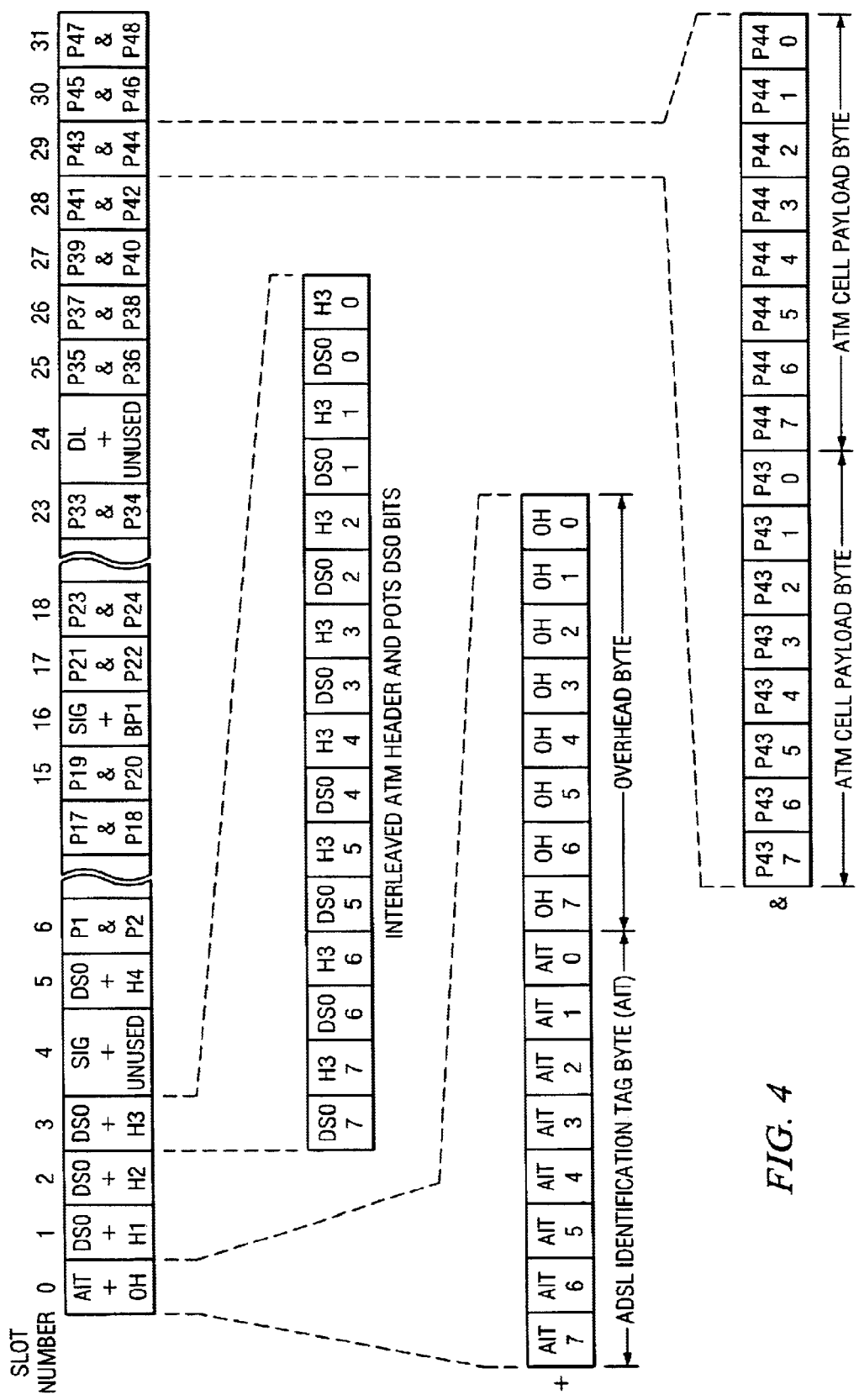
FIG. 4 is a diagram illustrating an embodiment of assignment of an ATM cell payload, DS0 signals, and control signals into the time slots of an SBI frame in accordance with the present invention.

The present invention provides an asymmetrical digital subscriber line (ADSL) upstream subscriber bus interface (SBI) protocol for upstream transmission of SBI frames in a SBI channel bank comprising a plurality of line cards connected to a control unit through the SBI. Each SBI frame transmitted on the SBI according to the present invention includes SBI time slots for carrying payload bytes of a broadband asynchronous transfer mode "ATM" cell and narrowband digital signals, such as Digital Signal 0 (DS0)

channel signals, which are provided from industry-standard telephony channels. The narrowband digital signals referred to herein are generated from narrowband line cards with a data rate equal to or less than a DS1 line card. Narrowband line cards that transmit such narrowband digital signals include DS1, T1, and POTS line cards. The broadband signals are transmitted from ADSL line cards.

An overhead byte is assigned to one of the SBI time slots within the SBI frame of the present invention. The overhead byte preferably includes back pressure indicator (BPI) bits, cell type indicator bits, and port identifier bits, as described in more detail in the text which follows. The overhead byte may alternatively include an arbitrary selection of bits to fill a portion of a frame of an SBI time slot.

The SBI frame formatted according to the protocol of the present invention is capable of being transmitted from either narrowband line cards or from a broadband line card to a control unit. The control unit may be either a broadband ADSL bank control unit (ABCU) or a conventional narrowband bank control unit (BCU).

Two versions of formatting an SBI frame, denoted as Ver. 1 and Ver. 2, for transmission at data rates of 2.048 MHZ and 4.096 MHZ respectively, are shown in Table A below. In Ver. 1, each SBI frame is capable of carrying two DS0 channels for conventional POTS and one-half of an ATM cell at an effective data transmission rate of 2.048 million bits per second (Mbps), which is the same as the effective data transmission rate of a conventional SBI channel bank system. Each SBI time slot carries one information byte including eight bits which are interleaved with reserved bits, which are assigned to carry information. Within each SBI time slot, a reserved bit is interspersed between adjacent information bits in a scheme similar to that which is illustrated in FIG. 1 and described above. In Ver. 2, the SBI frame according to the present invention carries four POTS DS0 channels and a full ATM cell, and is capable of being transmitted at twice the transmission rate of the SBI frame in Ver. 1.

TABLE A

| SBI Time Slot No. | Ver. 1 bits (7:0) | Ver. 2 bits (15:8) OR *odd bits | Ver. 2 bits (7:0) OR *even bits | time (μS) | Notes |
|---|---|---|---|---|---|
| 0 | OH | AIT | OH | 0.00000 | Overhead byte (includes BPI) |
| 1* | DS0 #0 | DS0 #0 | H1 | 3.90625 | POTS #0; ATM header byte 1 |
| 2* | DS0 #1 | DS0 #1 | H2 | 7.81250 | POTS #1; ATM header byte 2 |
| 3* | H1 or P23 | DS0 #2 | H3 | 11.71875 | POTS #2; ATM header byte 3 |
| 4* | SIG | SIG | — | 15.62500 | Signaling channel for DS0 #0–3 (old) |
| 5* | H2 or P24 | DS0 #3 | H4 | 19.53125 | POTS #3; ATM header byte 4 |
| 6 | H3 or P25 | P1 | P2 | 23.43750 | ATM cell payload |
| 7 | H4 or P26 | P3 | P4 | 27.34375 | ATM cell payload |
| 8 | P1 or P27 | P5 | P6 | 31.25000 | ATM cell payload |
| 9 | P2 or P28 | P7 | P8 | 35.15625 | ATM cell payload |
| 10 | P3 or P29 | P9 | P10 | 39.06250 | ATM cell payload |
| 11 | P4 or P30 | P11 | P12 | 42.96875 | ATM cell payload |
| 12 | P5 or P31 | P13 | P14 | 46.87500 | ATM cell payload |
| 13 | P6 or P32 | P15 | P16 | 50.78125 | ATM cell payload |
| 14 | P7 or P33 | P17 | P18 | 54.68750 | ATM cell payload |
| 15 | P8 or P34 | P19 | P20 | 58.59375 | ATM cell payload |

TABLE A-continued

| SBI Time Slot No. | Ver. 1 bits (7:0) | Ver. 2 bits (15:8) OR *odd bits | Ver. 2 bits (7:0) OR *even bits | time (μS) | Notes |
|---|---|---|---|---|---|
| 16* | SRQ | SRQ | BPI | 62.50000 | SBI service request channel (old); Back Pressure Indication (new) |
| 17 | P9 or P35 | P21 | P22 | 66.40625 | ATM cell payload |
| 18 | P10 or P36 | P23 | P24 | 70.31250 | ATM cell payload |
| 19 | P11 or P37 | P25 | P26 | 74.21875 | ATM cell payload |
| 20 | P12 or P38 | P27 | P28 | 78.12500 | ATM cell payload |
| 21 | P13 or P39 | P29 | P30 | 82.03125 | ATM cell payload |
| 22 | P14 or P40 | P31 | P32 | 85.93750 | ATM cell payload |
| 23 | P15 or P41 | P33 | P34 | 89.84375 | ATM cell payload |
| 24* | DL | DL | — | 93.75000 | SBI data link channel (old) |
| 25 | P16 or P42 | P35 | P36 | 97.65625 | ATM cell payload |
| 26 | P17 or P43 | P37 | P38 | 101.56250 | ATM cell payload |
| 27 | P18 or P44 | P39 | P40 | 105.46875 | ATM cell payload |
| 28 | P19 or P45 | P41 | P42 | 109.37500 | ATM cell payload |
| 29 | P20 or P46 | P43 | P44 | 113.28125 | ATM cell payload |
| 30 | P21 or P47 | P45 | P46 | 117.18750 | ATM cell payload |
| 31 | P22 or P48 | P47 | P48 | 121.09375 | ATM cell payload |

*Bit interleaving within SBI time slot for version 2 only.

The SBI frame according to the present invention includes 32 time slots numbered in a sequential order from 0 to 31, with SBI time slot #0 being transmitted first and the SBI time slot #31 being transmitted last within each SBI frame. An overhead byte denoted as "OH" is assigned to SBI time slot #0. In Ver. 1, the overhead byte is assigned to SBI time slot #0. Two conventional POTS digital signal channels, denoted as "DS0#0" and "DS0#1," are assigned to SBI time slots 1 and 2, respectively. A signaling byte, denoted as "SIG" for carrying a signaling channel for the POTS digital signal channels DS0#0 and DS0#1, is assigned to SBI time slot #4. A service request byte, denoted as "SRQ" for carrying an SBI service request channel, is assigned to SBI time slot #16. An SBI data link byte, denoted as "DL" for carrying an SBI data link channel, is assigned to SBI time slot #24. The signaling channel, the SBI service request channel and the SBI data link channel are assigned to the respective time slots which correspond to the time slots in a conventional SBI frame for carrying the respective channels as shown in FIG. 1 and described above. Therefore, Ver. 1 of the SBI time slot assignment as listed in Table A above is compatible with the conventional SBI frame format.

In this embodiment, the SBI frame format according to the present invention allows the SBI frame to be transmitted from an ADSL line card to a conventional narrowband BCU for receiving the upstream POTS DS0 traffic while avoiding compatibility problems between the conventional SBI frame format for carrying the conventional POTS digital signal channels and the SBI frame format for carrying upstream ATM traffic as well as the conventional POTS channels according to the present invention.

Furthermore, Ver. 1 of the SBI frame format according to the present invention is capable of carrying one-half of an ATM cell. SBI time slots #3, 5–15, 17–23 and 25–31 are each assigned either an ATM header byte or an ATM payload byte depending upon whether the SBI frame carries the first half or the second half of an ATM cell. In the case in which the SBI frame carries the first half of an ATM cell, SBI time slot #3, 5, 6 and 7 are assigned to carry four ATM header bytes numbered consecutively from H1 to H4, respectively, as listed in Table A above. ATM payload bytes P1–P8 of the first half of the ATM cell are assigned to SBI time slots #8–15, respectively. ATM payload bytes P9–P15 of the first half of the ATM cell are assigned to SBI time slots #17–23, respectively. ATM payload bytes P16–P22 of the first half of the ATM cell are assigned to SBI time slots #25–31, respectively.

If the SBI frame of Ver. 1 is designated to carry the second half of an ATM cell, ATM payload byte P23 is assigned to SBI time slot #3 of the SBI frame. SBI payload bytes P24–P34 are assigned to SBI time slots #5–15, respectively. ATM payload bytes P35–P41 of the second half of the ATM cell are assigned to SBI time slots #17–23, respectively. ATM payload bytes P42–P48 of the second half of the ATM cell are assigned to SBI time slots #25–31, respectively. In Ver. 1 of the SBI frame format according to the present invention, two SBI frames are required for carrying the header bytes and the payload bytes of a complete ATM cell.

In accordance with the present invention, the overhead byte OH is assigned to SBI time slot #0, which is the first time slot within the SBI frame. FIG. 3 shows an embodiment of bit mapping of the overhead byte according to the present invention. The bits within each byte are numbered consecutively from 7 to 0, with bit #7 being the most significant bit and bit #0 being the least significant bit. Bit #7 is transmitted first and bit #0 is transmitted last within the respective byte. As shown in FIG. 3, four back pressure indicator (BPI) bits, denoted as BP_3, BP_2, BP_1 and BP_0, are assigned to bits #7–4 of the overhead byte, respectively. Each of the BPI bits is assigned either "0" or "1" for signifying whether to allow "back pressure," that is, for disabling or enabling downstream transmission within a respective channel from the control unit to a respective port on the ADSL line card. In the example illustrated in FIG. 3, the bit mapping of the overhead byte allows up to four ADSL ports to be provided on each ADSL line card, each of the ADSL ports supporting a respective one of four channels of communication, either upstream or downstream, between the ADSL line card and the ABCU.

For example, bit #7, which is assigned BP_3 among the BPI bits, may be bitmapped to indicate whether to disable or to enable downstream transmission from the ABCU to port #3 on the ADSL line card. Bit #6 (BP_2) may be assigned to indicate either the disabling or the enabling of downstream transmission from the ABCU to port #2. Bit #5 (BP_1) may be bitmapped to indicate the back pressure for port #1, and bit #4 (BP_0) may be bitmapped to indicate the back pressure for port #0. Each of the BPI bits may be assigned a "0" to indicate the disabling of downstream transmission from the ABCU to the respective port on the ADSL line card along the respective channel and a "1" for enabling the downstream transmission along the respective channel. Alternatively, each of the BPI bits may be assigned either "0" for enabling the downstream transmission or "1" for disabling the downstream transmission from the ABCU to the respective port on the ADSL line card.

FIG. 3 also shows that two cell type indicator bits, denoted as CT_1 and CT_0, are assigned to bit #3 and bit #2 of the overhead byte, respectively. For Ver. 1 of the SBI time slot assignment listed in Table A above, each SBI frame is capable of carrying one-half of an ATM cell. An example of the coding of the cell type indicator bits for Ver. 1 of the SBI frame format is listed in Table B below.

TABLE B

| CT_1 | CT_0 | Cell Type Indication |
|---|---|---|
| 0 | 0 | First half of an ATM cell |
| 0 | 1 | Second half of an ATM cell |
| 1 | 0 | Idle cell |
| 1 | 1 | Unused |

In the example illustrated in Table B above, the cell type indicator bits CT_1 and CT_0 indicate that the SBI frame contains the first half of an ATM cell when they are coded 00. When the cell type indicator bits CT_1 and CT_0 are coded 01, the SBI frame carries the second half of an ATM cell. Furthermore, the cell type indicator bits CT_1 and CT_0 may optionally be assigned 10 for indicating that the SBI frame contains an idle cell or 11 for indicating that the SBI time slots for carrying the ATM header bytes or payload bytes are unused. The cell type indicator bits are not limited to the cell type indications listed in Table B above. It is understood by one of ordinary skill in the art that other bit coding schemes for the cell type indicator bits are also feasible.

Furthermore, two port identifier bits denoted as Pid_1 and Pid_2 may be provided within the overhead byte to indicate which ADSL port number on the ADSL line card is transmitting the current ATM cell from the respective ADSL port to the control unit. In the example shown in FIG. 3, bit #1 and bit #0 of the overhead byte are bitmapped with the port identifier bits Pid_1 and Pid_0, respectively. In the example in which four ADSL ports are provided on the ADSL line card, the port identifier bits Pid_1 and Pid_0 may be assigned to indicate the port numbers as listed in Table C below.

TABLE C

| Pid_1 | Pid_0 | Port Number Indication |
|---|---|---|
| 0 | 0 | Port #0 |
| 0 | 1 | Port #1 |
| 1 | 0 | Port #2 |
| 1 | 1 | Port #3 |

FIG. 3 shows only an example of the coding of the port identifier bits for indicating the port numbers. It is understood by one of ordinary skill in the art that other bit coding schemes may also be used for the port identifier bits.

Furthermore, if an ADSL line card is provisioned to carry a fixed number of ADSL ports, for example, four ADSL ports, it is not required that the upstream ATM traffic from each of the four ADSL ports be limited to one-fourth of the total available bandwidth. The different ADSL ports on the ADSL line card can share the total available upstream bandwidth depending upon the amount of upstream traffic from each of the four ADSL ports in different situations. For example, when heavy upstream ATM traffic is present on one of the ADSL ports on the ADSL line card, the ADSL line card may be provisioned to allocate more bandwidth to this particular ADSL port than to the other ADSL ports on the line card. The port identifier bits allow for equal sharing of the total available bandwidth among the different ADSL ports on the line card based upon demand for upstream traffic.

Alternatively, if the total available bandwidth for upstream transmission need not be shared equally on demand by the different ADSL ports on the ADSL line card, the port identifier bits need not be included in the overhead byte. The ATM cells may be transmitted upstream from the respective ADSL ports on the ADSL line card to the control unit in a sequence such as a round robin sequence, thereby avoiding the need for providing the port identifier bits in the overhead byte.

The present invention provides another embodiment of the upstream ADSL SBI protocol utilizing the reserved bits within each SBI time slot of a conventional SBI frame to increase the affective data transmission rate to 4.096 Mbps per ADSL line card, using the same clock rate of 4.096 MHZ as in the conventional SBI channel bank system. Referring back to Table A, Ver. 2 of the SBI time slot assignment in accordance with the present invention utilizes both the higher order byte including eight bits numbered consecutively from bit #15 to bit #8 (15:8) and the lower order byte including eight bits numbered consecutively from bit #7 to bit #0 (7:0) within the SBI time slots to carry up to four conventional POTS DS0 channels and an entire ATM cell in an SBI frame.

In order for the ABCU to distinguish an ADSL line card from a conventional POTS line card, the SBI frame according to the present invention includes an ADSL identification tag (AIT) byte for identifying that the line card is an ADSL line card. Upon reading the AIT byte from the ADSL line card, the ABCU recognizes that the line card from which the SBI frame is transmitted is an ADSL line card. If the ADSL line card is plugged into a conventional narrowband BCU, the BCU does not recognize the AIT byte, and instead treats the SBI frame as if it is a conventional SBI frame for upstream POTS traffic. The conventional narrowband BCU would still be able to receive the conventional POTS DS0 channels carried within the SBI frame according to the present invention. The ADSL line card transmitting the SBI frame according to the present invention is thus compatable with both the ABCU and the conventional narrowband BCU.

In the SBI frame format of Ver. 2 as shown in Table A above, the AIT bits and the overhead bits are not interleaved with each other within the SBI time slot #0, although in a different embodiment, the AIT bits and the overhead bits may be interleaved with each other within the SBI time slot #0 prior to the upstream transmission from the ADSL line card to the control unit.

As shown in Table A above, the SBI frame format according to Ver. 2 allows for the assignment of up to four POTS DS0 channels numbered consecutively from DS0#0 to DS0#3 and an entire ATM cell which includes ATM header bytes H1–H4 and ATM payload bytes P1–P48. The four DS0 channels DS0#0–DS0#3 are assigned to the odd bits of the SBI time slots #1, 2, 3 and 5, respectively. The ATM header bytes H1–H4 are assigned to the even bits of the SBI time slots #1–3 and 5, respectively. As indicated in Table A above, the DS0 byte and the ATM header byte within each of the SBI time slots #1–3 and 5, which are indicated with astericks (*), are bit interleaved with each other. Within each of the SBI time slots #1–3 and 5, the DS0 bits are assigned to the odd bits (15, 13, 11, . . . ) and the ATM header bits are assigned to the even bits (14, 12, 10, . . . ) before they are transmitted from the ADSL line card to the control unit.

FIG. 4 shows the assignment of SBI time slots according to Ver. 2 including the bit interleaving of the ATM header byte and the POTS DS0 byte in an SBI time slot according to the present invention. As shown in FIG. 4, the POTS DS0 bits and the ATM header bits within one of the SBI time slots #1–3 and 5, for example SBI time slot #3, are bit interleaved with each other. In the example shown in FIG. 4, bit #7 of the DS0 byte within SBI time slot #3 is followed by bit #7 of the ATM header byte H3, which is in turn followed by bit #6 of the DS0 byte and so on. The DS0 bits 7, 6, 5, 4, 3, 2, 1 and 0 occupy the odd bits 15, 13, 11, 9, 7, 5, 3 and 1 of the SBI time slot #3, respectively. Bits 7, 6, 5, 4, 3, 2, and 0 of the ATM header byte H3 occupy the even bits 14, 12, 10, 8, 6, 4, 2 and 0 of the SBI time slot #3, respectively. The same bit interleaved format also applies to SBI time slots #1, 2 and 5 as indicated in Table A above.

In order for the control unit, which can be either an ABCU or a conventional narrowband BCU to receive the conventional POTS signaling channel, the SBI service request channel and the SBI data link channel for the conventional POTS DS0 traffic, a signaling (SIG) byte, a service request (SRQ) byte and a SBI data link (DL) byte are assigned to SBI time slots #4, 16 and 24, respectively. The SIG bits are assigned to the odd bits of the SBI time slot #4, and the even bits of the SBI time slot #4 remain as reserved bits. In a similar manner, the DL bits are assigned to the odd bits of the SBI time slot #24 while the even bits of the SBI time slot #24 remain as reserved bits. The provision of the signaling channel and the SBI data link channel in the respective SBI time slots #4 and 24 thus allows Ver. 2 of the SBI frame format in accordance with the present invention to be compatible with the SBI frame format for the conventional upstream POTS traffic as shown in FIG. 1 and described above.

Referring to Table A above, the SRQ bits are assigned to the odd bits of the SBI time slot #16 while a back pressure indicator (BPI) byte is assigned to the even bits of the SBI time slot #16. An example of the bitmapping of the BPI byte within the SBI time slot #16 is shown in FIG. 5, with BPI bits BP_3, BP_2, BP_1 and BP_0 assigned to bits 7–4 of the BPI byte, respectively. Bits 3–0 of the BPI byte are not assigned in this embodiment. The BPI bits may be coded in the same manner as the BPI bits in the overhead byte as shown in FIG. 3 and described above. For example, each of the BPI bits BP_3, BP_2, BP_1 and BP-0 may be assigned either "0" or "1" to indicate the absence or the presence of back pressure, that is, whether to disable or to enable downstream transmission from the ABCU to a respective one of the four ADSL ports on the ADSL line card.

Referring back to Table A, the bits of the SRQ byte are assigned to the odd bits (15, 13, 11, . . . ) of the SBI time slot #16, while the bits of the BPI byte are assigned to the even bits (14, 12, 10, . . . ) of the SBI time slot #16. The interleaving of the SRQ bits with the. BPI bits allows a conventional narrowband BCU to receive the SRQ channel for conventional upstream POTS traffic while ignoring the BPI bits which are assigned to the even bits of the SBI time slot #16. The conventional narrowband BCU, which is provisioned to read every other bit while clocked by a 4.096 MHZ clock, reads only the odd bits which carry the SRQ channel for the conventional upstream POTS traffic and ignores the BPI bits as if they are reserved bits. Because the BPI bits are used only for regulating the back pressure, that is, the downstream traffic from an ABCU to an ADSL line card, the BPI bits are irrelevant to the conventional narrowband BCU which is concerned with narrowband traffic provided, for example, by POTS, T1 and DS0 line cards.

On the other hand, if the ADSL line card transmitting the SBI frame according to the present invention is connected to an ABCU, the ABCU receives both the SRQ channel for the POTS traffic and the BPI byte for indicating whether to enable or to disable downstream transmission from the ABCU to the different ADSL ports on the ADSL line card. In Ver. 2 of the SBI frame format as shown in Table A above, the BPI bits are transmitted twice within an SBI frame, the first time within the overhead byte in SBI time slot #0 and the second time in the even bits of the SBI time slot #16. The transmission of the BPI bits twice in a single SBI frame provides redundancy and allows the ABCU to determine whether to enable or to disable downstream transmission to each of the ADSL ports on the ADSL line card while the upstream transmission of the SBI frame continues, without having to wait until the start of the upstream transmission of the next SBI frame from the ADSL line card to the ABCU. Alternatively, the even bits of the SBI time slot #16 may simply be left as reserved bits while the SRQ channel is carried by the odd bits, such that the BPI bits are transmitted as part of the overhead byte once within an SBI frame.

The purpose of interleaving the DS0 bits with the respective ATM header bits within SBI time slots #1–3 and 5 is similar to that of the interleaving of the SIG bits, the SRQ bits and the DL bits within the SBI time slot #4, 16 and 24, respectively. When the ADSL line card is connected to a conventional narrowband BCU, the BCU only reads every other bit of the SBI frame transmitted from the ADSL line card. When the conventional narrowband BCU is provisioned to read only the odd bits within each SBI time slot, only the DS0 bits which are assigned to the odd bits of the SBI time slots #1–3 and 5 are read by the conventional narrowband BCU. The even bits within the SBI time slots #1–3 and 5, which carry the ATM header bytes H1–H4, are ignored by the conventional narrowband BCU, which treats the even bits within each SBI time slot as if they are reserved bits.

On the other hand, when the ADSL line card is connected to an ABCU, which includes both the processing components of the conventional narrowband BCU and the processing components for ATM over ADSL, both the odd bits and the even bits within each SBI time slot are received and processed by the ABCU. The four DS0 channels, DS0#0–DS0#3, are treated as conventional POTS DS0 channels and the ATM header bytes H1–H4 serve as the header of an ATM cell, which also includes the ATM payload bytes P1–P48.

The ATM payload bytes P1–P48 are assigned to SBI time slots #6–15, 17–23 and 25–31. Each of these SBI time slots contains two ATM payload bytes, which are transmitted sequentially within the respective SBI time slots. For example, ATM cell payload byte P1 is assigned to the higher order bits (15:8) of the SBI time slot #6 and the ATM cell payload byte P2 is assigned to the lower order bits (7:0) of the SBI time slot #6. The ATM payload byte P1 is transmitted from the ADSL line card to the control unit prior to the transmission of the ATM payload byte P2. In this embodiment, the ATM payload bytes P1 and P2 are not bit interleaved with each other within the SBI time slot #6. In an alternate embodiment, the bits of the two ATM payload bytes within each of the SBI time slot #6–15, 17–23 and 25–31 are interleaved with each other, thereby producing a SBI frame in a fully bit-interleaved format.

FIG. 4 shows an example of the assignment of ATM cell payload bytes P43 and P44 within the SBI time slot #29. The ATM payload byte P43 includes 8 bits numbered consecutively from 7 to 0 with bit #7 being the most significant bit and bit #0 being the least significant bit within the ATM payload byte P43. Similarly, the ATM payload byte P44 includes 8 bits numbered consecutively from bit #7 to bit #0. The ATM cell payload bytes are each transmitted from the ADSL line card to the control unit in a sequence from the most significant bit #7 to the least significant bit #0.

Within each of the SBI time slots for carrying the ATM payload bytes, the odd-ordered byte is transmitted before the even-ordered byte. For example, the ATM payload byte P43 is transmitted before the ATM payload byte P44 within the SBI time slot #29. Alternatively, within each of the SBI time slots for carrying the ATM payload bytes, the odd-ordered ATM payload byte may be bit interleaved with the respective even-ordered ATM payload byte. For example, within the SBI time slot #29, bit #7 of the ATM payload byte P39 may be followed by bit #7 of the ATM payload byte P40, which is in turn followed by bit #6 of the ATM payload byte P39, and so on. However, bit interleaving of the ATM payload bytes is not critical to the present invention.

The overhead byte, which is assigned to the lower order bits (7:0) in the SBI time slot #0 in Ver. 2 of the SBI frame format according to the present invention, may have a bitmapped format as shown in FIG. 3. The BPI bits BP_3, BP_2, BP_1 and BP_0 are assigned to bits 7–4 of the overhead byte, respectively. Each of the BPI bits is assigned either "0" or "1" for indicating whether to disable or to enable downstream transmission from the ABCU to a respective one of the ADSL ports on the ADSL line card as described above. The cell type indicator bytes CT_1 and CT_0 are assigned to bit #3 and bit #2, respectively. For Ver. 2 of the SBI frame format according to the present invention, the cell type indicator bits may be coded according to Table D below.

TABLE D

| CT_1 | CT_0 | Cell Type Indication |
|---|---|---|
| 0 | 0 | Normal ATM cell |
| 0 | 1 | CPU (OAM) cell |
| 1 | 0 | Reserved |
| 1 | 1 | Null/idle cell |

In the example shown in Table D above, when both CT_1 and CT_0 are assigned bits 00, the ADSL line card signifies to the ABCU that the SBI frame carries a normal ATM cell. When the cell type indicator bits CT_1 and CT_0 are assigned 01, the ADSL line card signifies to the ABCU that the SBI frame contains a central processing unit (CPU) cell or a control cell such as an operation and the maintenance (OAM) cell. The CPU cell or OAM cell is transmitted from the ADSL line card to the ABCU for controlling the operation and processing of the ABCU, for example. The coding of 10 to the cell type indicator bits CT_1 and CT_0 indicates that the ATM cell within the SBI frame is a reserved cell, and the coding of 11 to the cell type indicator bits CT_1 and CT_0 indicates that the ATM cell within the SBI frame is a null or idle cell. Even if the ATM cell within the SBI frame is a reserved or idle cell, conventional POTS data traffic may still be transmitted upstream from the ADSL line card to the ABCU through the four DS0 channels, which are not affected by the absence of payload data within the ATM cell.

As shown in FIG. 3, two port identifier bits Pid_1 and Pid_0 are assigned to bit #1 and bit #0 of the overhead byte, respectively. In a manner similar to that which is applicable to Ver. 1 of the SBI frame format according to the present invention and described above, it is not required that the upstream ATM traffic from each of the ADSL ports on the ADSL line card be limited to an equal share of the total available bandwidth. The different ADSL ports on the ADSL line card may be provisioned to share the overall available upstream bandwidth as needed. For example, an ADSL port which is assigned to carry heavier ATM traffic than the other ADSL ports on the ADSL line card may be allocated more bandwidth than the bandwidths allocated to the other ADSL ports. The port identifier bits allow unequal sharing of the total upstream bandwidth among the different ADSL ports on the ADSL line card.

In an alternate embodiment, the port identifier bits need not be provided within the overhead byte at all. In this case, the ATM cells may be transmitted upstream from the different ADSL ports on the ADSL line card to the ABCU in a round robin sequence, for example, thereby obviating the need for the port identifier bits. However, the upstream bandwidth could not be shared on demand by each of the ADSL ports on the ADSL line card without the port identifier bits.

Figure 6:
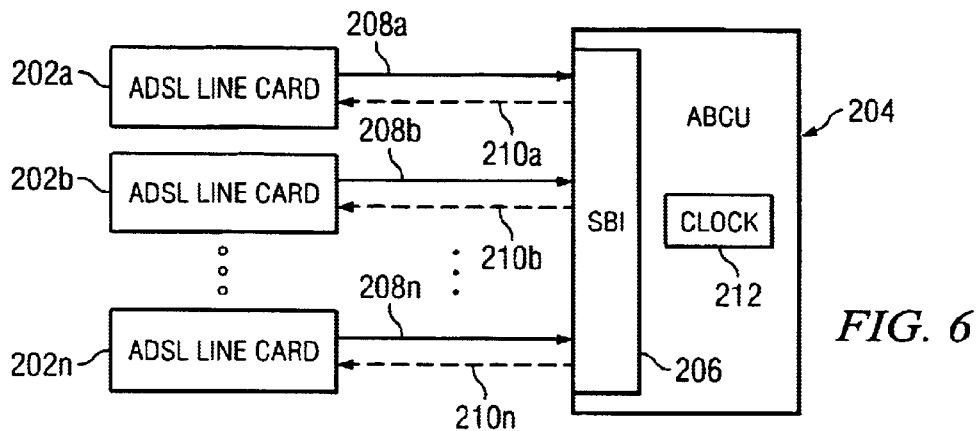
FIG. 6 is a simplified block diagram showing the upstream transmission of the SBI frame according to the present invention from asymmetrical digital subscriber line (ADSL) line cards to an ADSL bank control unit (ABCU)

FIG. 6 shows a block diagram of an embodiment of an ADSL channel bank system to which the ADSL upstream SBI protocol according to the present invention is applicable. ADSL line cards 202a, 202b, . . . 202n are connected to an ADSL bank control unit (ABCU) 204 through a subscriber bus interface (SBI) 206. The SBI frames formatted according to the ADSL upstream SBI protocol of the present invention are transmitted upstream from the ADSL line cards 202a, 202b, . . . 202n in an upstream direction indicated by solid arrows 208a, 208b, . . . 208n to the ABCU, which includes both the processing components of a narrowband bank control unit (BCU) for the processing of conventional POTS digital signals and the processing components for the ATM cells transmitted over the ADSL. Dashed arrows 210a, 210b, . . . 210n indicate the downstream transmission from the ABCU 204 to the respective ADSL line cards 202a, 202b, . . . 202n. The back pressure indicator (BPI) bits, which are provided in the overhead byte according to the present invention, are transmitted upstream from a respective one of the ADSL line cards 202a, 202b, . . . 202n to the ABCU 204 and signify to the ABCU 204 whether to enable or to disable the downstream transmission within a respective one of the channels as indicated by arrows 210a, 210b, . . . 210n.

In Ver. 2 of the SBI frame format according to the present invention, the BPI bits are transmitted twice within each SBI frame, a first time within the overhead byte in SBI time slot #0 and a second time in SBI time slot #16. The ABCU 204 is capable of starting downstream transmission of data to a respective one of the ADSL line cards 202a, 202b, . . . 202n without having to wait for the complete transmission of the upstream SBI frame. The clock 212, which runs at a clock rate of 4.096 MHZ, for example, allows the SBI frames to be transmitted upstream from each of the ADSL line cards 202a, 202b, . . . 202n to the ABCU at a data rate of 4.096 Mbps, thereby doubling the effective upstream data transmission rate of a conventional narrowband SBI channel bank for carrying POTS traffic.

Figure 7:
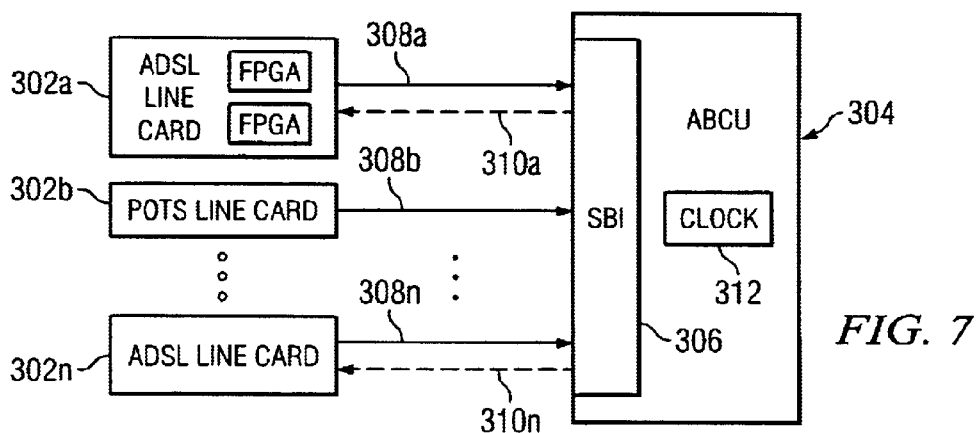
FIG. 7 is a simplified diagram showing the ABCU connected to a plurality of line cards including at least one POTS line card and at least one ADSL line card.

FIG. 7 shows another embodiment of an ADSL channel bank system to which the ADSL upstream SBI protocol according to the present invention is applicable. In this embodiment, line cards 302a, 302b, . . . 302n include a mixture of ADSL line cards such as line cards 302a and 302n and at least one conventional POTS line card such as line card 302b connected to the ABCU 304 through the SBI 306. The ADSL line cards 302a and 302n are each capable of transmitting SBI frames according to the frame format of the present invention to the ABCU 304, which is capable of processing both POTS DS0 data and ATM data within the SBI time slots. The conventional POTS line card 302b is capable of transmitting SBI frames in a conventional SBI frame format, such as that which is illustrated in FIG. 1, for carrying upstream POTS traffic. The ABCU 304 is capable of supporting both wide band ADSL line cards such as the line card 302a and conventional narrowband POTS line cards such as the line card 302b because the ABCU 304 includes all of the processing components of the conventional narrowband BCU and the components for processing the ATM cells carried over the ADSL. The upstream transmission from the line cards 302a, 302b, . . . 302n are indicated by solid arrows 308a, 308b, . . . 308n leading to the ABCU 304 through the SBI 306. The downstream transmission from the ABCU 304 to the ADSL line cards 302a and 302n are indicated by dashed arrows 310a and 310n, respectively. The downstream transmission from the ABCU 304 to a respective one of the ADSL line cards 302a, 302n is controlled by the BPI bits carried within the respective SBI frame, which is transmitted upstream from the respective ADSL line card. A conventional POTS line card such as line card 302b transmits only conventional SBI frames according to the format of FIG. 1, and does not transmit BPI bits to the ABCU 304 to indicate either the enabling or the disabling of downstream transmission from the ABCU 304 to the conventional POTS line card 302b. Downstream transmission from the control unit 304 to the conventional POTS line card 302b is carried separately from the upstream channel. The clock 312, which operates at a clock rate of 4.096 MHZ, for example, is capable of clocking the upstream transmission of either the SBI frames formatted according to the present invention at an effective data rate of 4.096 Mbps or the conventional SBI frames carrying only upstream POTS traffic at an effective data rate of 2.048 Mbps.

Figure 8:
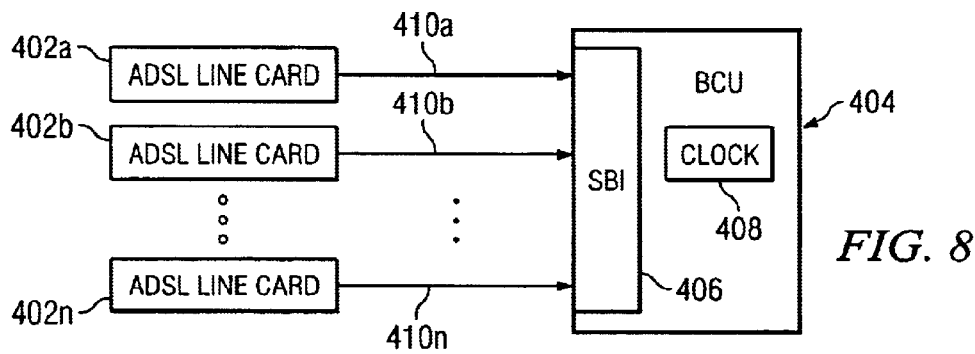
FIG. 8 is a simplified block diagram showing a conventional narrowband BCU connected to a plurality of ADSL line cards which are capable of transmitting the SBI frames according to the present invention.
Figure 9:
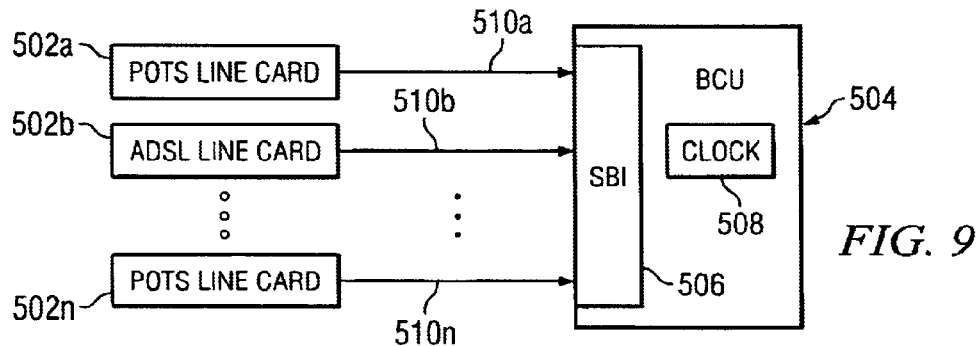
FIG. 9 is a simplified diagram showing the conventional narrowband BCU connected to a plurality of line cards including at least one ADSL line card and at least one POTS line card.

FIG. 7 further illustrates components which may be used on a line card to generate TDM data for transmission to the SBI 306 of the ABCU 304. As shown, the ADSL line card 302a includes field programmable gate array (FPGA) chips 701–703. The FPGAs 701–703 receive digital data signals directed from individual subscriber lines provided to the line card 302a. The FPGA are programmed to format the data signals from individual subscribers to provide SBI frames according to the present invention for transmission from the line card 302a to the SBI 306 of the ABCU. Although not shown, FPGAs are also typically included in other type line cards, such as POTS, DS1 and T1 line cards, to similarly format data for SBI frames as described above. Similarly, although the formatted data is shown transmitted to an SBI 306 of an ABCU 304, the formatted data can be transmitted to an SBI 406 of a BCU 404 as shown in FIGS. 8 and 9 according to the present invention. Although FPGAs are shown in FIG. 7 for formatting SBI frames, an application specific integrated circuit (ASIC), digital signal processor (DSP), or microprocessor might likewise function to similarly format SBI data according to the present invention.

In FIG. 8, ADSL line cards 402a, 402b, . . . 402n are connected to a conventional narrowband bank control unit (BCU) 404 through a subscriber bus interface (SBI) 406. SBI frames formatted according to the ADSL upstream SBI protocol of the present invention can be transmitted from the respective ADSL line cards 402a, 402b, . . . 402n upstream to the conventional narrowband BCU 404. The SBI frames may be transmitted in a format according to either Ver. 1 or Ver. 2 as listed in Table A and described above. The conventional narrowband BCU 404 is capable of reading the upstream data at an effective data rate of 2.048 Mbps even though the clock 408 operates at a clock rate of 4.096 MHZ.

In the case in which the SBI frame is transmitted according to the format of Ver. 1 as shown in Table A according to the present invention, the effective data rate of transmission by each of the ADSL line cards 402a, 402b, . . . 402n is the same as the data rate of reception by the conventional narrowband BCU 404. The POTS digital signal channels DS0#0 and DS0#1, which are assigned to the SBI time slots #1 and 2, respectively, are received and processed by the conventional narrowband BCU 404 in the same manner as if they are assigned to the SBI time slots of a conventional SBI frame formatted according to the conventional SBI format as shown in FIG. 1. The signaling channel (SIG), the SBI service request channel (SRQ) and the SBI data link channel (DL) for the upstream POTS DS0 traffic are assigned to SBI time slot #4, 16 and 24, respectively, which are the same time slots as in a conventional SBI frame for the upstream POTS traffic. Therefore, the SBI frame of the present invention formatted according to Ver. 1 of the SBI frame format shown in Table A above allows the conventional narrowband BCU 404 to receive the upstream POTS traffic from the ADSL line cards 402a, 402b, . . . 402n, thereby allowing compatibility between the ADSL line cards 402a, 402b, . . . 402n and the conventional narrowband BCU 404.

SBI frames formatted according to Ver. 2 of the SBI frame format as shown in Table A in accordance with the present invention is also compatible with the conventional narrowband BCU 404. In this embodiment, an ADSL line card transmits the DS0 data in four DS0 channels allocated to the odd bits of SBI time slots #1–3 and 5, the SIG channel allocated to the odd bits of SBI time slot #4, the SRQ channel allocated to the odd bits of the SBI time slot #16, and the DL channel allocated to the odd bits of the SBI time slot #24. The conventional narrowband BCU 404, which operates only at an effective data rate of 2.048 Mbps, ignores every other bit in an SBI frame formatted according to Ver. 2 of the frame format as shown in Table A above.

The conventional BCU always reads and processes all the odd bits. But, the BCU can be provisioned to look at only some or all time slots. With bit interleaving of the odd and even bits in SBI time slots #1–5, 16 and 24, only the odd bits in these time slots containing the four DS0 channels, the SIG channel, the SRQ channel and the DL channel are processed by the conventional narrowband BCU 404. The ATM header bytes H1–H4 in the SBI time slots #1, 2, 3 and 5, respectively, and the BPI bits assigned to the even bits of the SBI time slot #16 are ignored by the conventional narrowband BCU 404. Since the conventional narrowband BCU 404 is not adapted for processing of ATM data assigned to some of the SBI time slots in the SBI frame according to the present invention, the BCU 404 can be easily provisioned to ignore the ATM data in these time slots, for example, time slot #6–15, 17–23 and 25–31. Since the downstream POTS traffic from the conventional narrowband BCU 404 is carried through separate channels to the respective line cards 402a, 402b, . . .402n, and, the conventional narrowband BCU 404 is provisioned to ignore the BPI bits, only the upstream arrows 410a, 410b, . . . 410n are shown leading from the respective ADSL line cards 402a, 402b, . . . 402n to the BCU 404.

FIG. 9 shows yet another embodiment of a channel bank system to which the ADSL upstream SBI protocol according to the present invention is applicable. Line cards 502a, 502b, . . . 502n include a mixture of conventional POTS line cards such as line cards 502a and 502n and at least one ADSL line card 502b connected to a conventional narrowband BCU 504 through the SBI 506. The ADSL line card 502b is capable of transmitting SBI frames formatted according to either Ver. 1 or Ver. 2 listed in Table A in accordance with the present invention. Since the SBI frame format according to the present invention is compatible with the conventional narrowband BCU 504 as described above, the BCU 504 is capable of receiving a mixture of POTS line cards as well as ADSL line cards which transmit the SBI frames formatted according to the present invention. As described above, a clock is provided at a clock rate of 4.096 MHZ, even though the conventional narrowband BCU 504 operates at an effective data rate of only 2.048 Mbps. As illustrated in FIG. 9, only the upstream arrows 510a, 510b, . . . 510n are shown leading from the respective line cards 502a, 502b, . . . 502n to the conventional narrowband BCU 504. The back pressure indicator (BPI) bits which are provided in the SBI frames according to the present invention are ignored by the conventional narrowband BCU 504. Downstream traffic from a conventional narrowband BCU 504 is carried through separate channels to the respective line cards 502a, 502b, . . . 402n.

As indicated in Table A, time slot #0 contains an overhead (OH) byte in the lower order position of time slot #0 and the higher order byte of time slot #0 is reserved for the AIT byte for identifying that a line card is an ADSL line card. Bits 2 and 3 of the OH byte (OH(3:2)) identify the cell type as indicated in Table B. As shown in Table B, an ABCU will ignore the cell if OH(3:2) is 10 or 11, and will do something with the cell if OH(3:2) is 00 or 01. Thus, only one bit, bit OH(3) in time slot #0, will determine if the ABCU will take or ignore an incoming cell.

The present invention provides for the OH byte to occupy the lower order position of time slot #0, as shown in Table A so that the AIT byte can be transmitted first. The AIT byte is transmitted first so that an ABCU will quickly recognize a transmitting line card to be an ADSL line card. The OH byte might also be assigned to the higher order position. However, a problem can arise with the OH byte transmitted before the AIT byte in certain circumstances when a narrowband line card, such as the POTS line card, causes generation of a logic 0 in bit OH(3) of time slot #0 as described below.

Referring to FIG. 7, an SBI 306 on a backplane can have an upstream trace 308a and a downstream trace 310a. The SBI 306 uses a clock 312 operating at 4 MHZ to time signals on the SBI traces 308a and 310a. The SBI 306, however, transmits data on only every other clock pulse of the 4 MHZ clock, producing only an effective 2 Mbit/sec data rate. For the in-between clock pulses, narrowband line cards are required to tristate their outputs. Due to stray capacitances, the logic state on a trace from the SBI 306 tends to remain the same during the in-between clock pulses as it was during the immediately prior clock pulse.

With a clock operating at 2 MHZ, no problem is created by the SBI traces retaining a previous value after being tri-stated because the value on a trace at intermediate clock times was ignored. However, with data being transmitted at 4 MHZ using the method of the present invention, the value on the trace at intermediate clock times will be captured and form part of a 16-bit SBI frame value read for the time slot #0.

For example, if at 2 MHZ a narrow band line card transmits 01010101, this can be read at 4 MHZ as 00110011 00110011. It can be seen that bit 3 of either the low order byte or higher order byte can easily be read as a logic 0. With the OH byte being the higher order byte of time slot #0, the cell type indication error would result in the ABCU erroneously interpreting incoming upstream data as an ATM or CPU (OAM) cell since the AIT byte has not yet been identified.

The OH byte and AIT byte transmitted in time slot #0 have no meaning for POTS cards. The bits transmitted in time slot #0 also have no meaning for ISDN and D1 narrowband line cards, but the OH byte in time slot #0 does have meaning for a T1 narrow band line card. A value that gets read at 4 MHZ to have a logic 0 in bit 3 if the OH byte which occupies the higher order byte of time slot #0 will cause an error if T1 line cards are used.

The present invention provides a data formatting scheme to prevent such errors. In the formatting scheme, the present invention first provides placement of the OH byte in the lower order byte of time slot #0, as described above. The present invention further provides the AIT byte in the higher order byte of time slot #0 with a format which cannot cause an error with narrowband line cards being connected to an SBI. The signature of the AIT byte includes data alternating between logic 1 and logic 0 at a 4 MHZ rate, such as 10101010, or "aa" in hexadecimal. Such a signature cannot be generated by narrowband cards, because such cards cannot change between logic value outputs at a rate greater than 2 MHZ. Further, with tri-stating of the output of the narrowband cards, the possible signal 11001100 11001100 will not result in the ABCU erroneously interpreting the incoming upstream data as an ATM or CPU (OAM) cell.

As shown in FIG. 4, the AIT byte including AIT bits 7–0 are assigned to the higher order byte and the overhead byte including overhead bits 7–0 are assigned to the lower order byte within SBI time slot #0 of the SBI frame. Since the AIT byte is assigned to the high order bits of the SBI time slot #0, the AIT bits are transmitted from the ADSL line card to a control unit before the overhead bits are transmitted to help prevent erroneous readings from the OH byte, and the AIT bits and OH byte bits are not interleaved within time slot #0.

Upon reading the AIT byte, which is transmitted before other bytes in the SBI frame from the ADSL line card by the ABCU, the ABCU recognizes that the line card from which the SBI frame is transmitted is an ADSL line card. If the ADSL line card is plugged into a conventional narrowband BCU, the BCU does not recognize the AIT byte, and instead treats the SBI frame as if it is a conventional SBI frame for upstream narrowband traffic, such as from a POTS line card. The conventional narrowband BCU would still be able to receive the conventional POTS DS0 channels carried within the SBI frame according to the present invention. The ADSL line card transmitting the SBI frame according to the present invention is thus compatible with both the ABCU and the conventional narrowband BCU.

Although the present invention has been described above with particularity, this was merely to teach one of ordinary skill in the art how to make and use the invention. Many other modifications will fall within the scope of the invention, as that scope is defined by the claims provided below.

What is claimed is:

1. A method of formatting a subscriber bus interface (SBI) frame comprising a plurality of SBI time slots for data communication, the method comprising the steps of:

assigning asynchronous transfer mode (ATM) payload bytes to some of the SBI time slots within the SBI frame;

assigning narrowband digital signal bytes to some of the SBI time slots within the SBI frame, wherein the SBI frame is configured for transmission from a line card to a control unit, the line card being selected from a group consisting of narrowband and broadband line cards, and wherein the narrowband line cards are selected from a group consisting of DSI, T1 and plain old telephone service (POTS) line cards, and wherein the broadband line card comprises an asymmetrical digital subscriber line (ADSL) line card; and assigning an overhead byte to one of the SBI time slots within the SBI frame, wherein the overhead byte includes back pressure indicator (BPI) bits, each of the BPI bits signifying whether to enable or to disable downstream transmission within a respective one of the channels from the control unit to a respective one of the ports on the ADSL line card.

2. The method of claim 1, wherein the narrowband digital signal bytes are transmitted at a data rate ranging from a data rate for DS1 signals per subscriber channel to a data rate for plain old telephone service (POTS) signals per subscriber channel.

3. The method of claim 1, wherein the control unit consists of the group consisting of an asymmetrical digital subscriber line (ADSL) bank control unit (ABCU) and a narrowband bank control unit (BCU).

4. The method of claim 1, wherein the ADSL line card has a bit transmission rate twice that of the POTS line card.

5. The method of claim 1, further comprising the step of assigning an ADSL identification tag (AIT) byte to one of the SBI time slots for identifying if the line card is the ADSL line card.

6. The method of claim 5, further comprising the step of assigning an overhead byte to one of the SST time slots within the SBI frame, wherein the overhead byte and the AIT byte are assigned to the same time slot within the SBI frame.

7. The method of claim 1, wherein the ADSL line card includes a plurality of ADSL ports each providing a respective one of a plurality of channels.

8. The method of claim 1, wherein each of the BPI bits is assigned a bit selected from the group consisting of "0" for disabling the downstream transmission within the respective channel and "1" for enabling the downstream transmission within the respective channel.

9. The method of claim 1, wherein the overhead byte further includes port identifier bits.

10. The method of claim 1, wherein the BPI bits include four BPI bits and the channels include four channels.

11. The method of claim 9, wherein the ADSL line card comprises four ADSL ports capable of supporting the four channels, respectively, and the port identifier bits include two port identifier bits for identifying each of the four ADSL ports.

12. The method of claim 1, wherein the overhead byte further includes cell type indicator bits.

13. The method of claim 12, wherein the cell type indicator bits include two cell type indicator bits.

14. A method of formatting a subscriber bus interface (SBI) frame comprising a plurality of SBI time slots for data communication, the method comprising the steps of:

assigning asynchronous transfer mode (ATM) payload bytes to some of the SBI time slots within the SBI frame;

assigning narrowband digital signal bytes to some of the SBI time slots within the SBI frame;

assigning a given one of the ATM payload bytes to a first one of the time slots within the SBI frame; and bit interleaving the given ATM payload byte with one of the narrowband digital signal bytes in the first time slot.

15. The method of claim 1, wherein the SBI time slots comprise 32 time slots are numbered consecutively from time slot 0 to time slot 31 in a temporal sequence, each of the time slots including a higher order byte and a lower order byte succeeding the higher order byte, wherein the overhead byte and the AIT byte are assigned to the time slot 0.

16. The method of claim 15, wherein the step of assigning the data bytes further comprises the step of assigning the ATM payload bytes to the time slots 6–15, 17–23, and 25–31.

17. The method of claim 16, wherein at least one of the POTS digital signal bytes is assigned to at least one of the time slots 1–5, the method further comprising the step of assigning at least one ATM header byte to at least one of the time slots 1–5.

18. The method of claim 17, further comprising the step of assigning a service request (SRQ) byte and a back pressure indicator (BPI) byte to the time slot 16, the SRQ byte for indicating a SBI service request channel and the BPI byte for signifying to the control unit whether to enable or to disable downstream transmission from the control unit to the line card.

19. The method of claim 18, further comprising the step of assigning a SBI data link (SBDL) byte to the time slot 24 for indicating a SBI data link channel.

20. The method of claim 19, further comprising the step of bit interleaving the higher order byte with the lower order byte within at least one of the time slots 1–5, 16 and 24.

21. A method of formatting a subscriber bus interface (SBI) frame comprising a plurality of SBI time slots for data communication, the method comprising the steps of:

assigning asynchronous transfer mode (ATM) payload bytes to some of the SBI time slots within the SBI frame for transmission from an asymmetrical digital subscriber line (ADSL) line card to a control unit;

assigning an overhead byte to one of the time slots within the SBI frame, the overhead byte including back pressure indicator (BPI) bits, cell type indicator bits, and port identifier bits; and assigning an ADSL identification tag (AIT) byte to one of the time slots within the SBI frame for identifying that the line card is an ADSL line card, wherein the ADSL line card includes a plurality of ADSL ports each providing a respective one of a plurality of channels and wherein each of the BPI bits signify whether to enable or to disable downstream transmission within a respective one of the channels from the control unit to a respective one of the ports on the ADSL line card.

22. The method of claim 21, wherein each of the BPI bits is assigned a bit selected from the group consisting of "0" for disabling the downstream transmission within the respective channel and "1" for enabling the downstream transmission within the respective channel.

23. The method of claim 22, wherein the BPI bits channels include four BPI bits and the channels include four channels.

24. The method of claim 23, wherein the ADSL line card comprises four ADSL ports capable of supporting the four channels, respectively, and the port identifier bits include two port identifier bits for identifying each of the four ADSL ports.

25. The method of claim 24, wherein the two port identifier bits are assigned respective bits selected from the group consisting of "00" to identify a first one of the ADSL ports, "01" to identify a second one of the ADSL ports, "10" to identify a third one of the ADSL ports, and "11" to identify a fourth one of the ADSL ports.

26. The method of claim 21, wherein the cell type indicator bits include two cell type indicator bits.

27. The method of claim 21, wherein the SBI time slots comprise 32 time slots numbered consecutively from time slot 0 to time slot 31 in a temporal sequence, each of the time slots including a higher order byte and a lower order byte succeeding the higher order byte, wherein the overhead byte and the AIT byte are assigned to the time slot 0.

28. The method of claim 27, wherein the step of assigning the payload bytes further comprises the step of assigning the payload bytes to the time slots 6–15, 17–23, and 25–31.

29. The method of claim 28, further comprising the step of assigning a service request (SRQ) byte and a back pressure indicator (BPI) byte to the time slot 16, the SRQ byte for indicating a SBI service request channel and the BPI byte for signifying to the control unit whether to enable or to disable downstream transmission from the control unit to the line card.

30. The method of claim 29, further comprising the step of assigning a SBI data link (SBDL) byte to the time slot 24 for indicating a SBI data link channel.

31. The method of claim 30, further comprising the step of bit interleaving the higher order byte with the lower order byte within at least one of the time slots 1–5, 16 and 24.

32. The method of claim 21, wherein the overhead byte and the AIT byte are assigned to the same time slot within the SBI frame.

33. A line card comprising:

a field programmable gate array (FPGA) having inputs configured for being coupled to receive data signals from subscriber lines, and outputs configured for transmitting subscriber bus interface (SBI) frames composed of SBI time slots to a control unit, the FPGA being programmed to generate the SBI frames by (a) assigning asynchronous transfer mode (ATM) payload bytes received from the subscriber lines to some of the SBI time slots within each of the SRI frames, and (b) assigning narrowband digital signal bytes received from the subscriber lines to some of the SBI time slots within each of the SBI frames, wherein the FPGA is further programmed to assign an overhead byte to one of the SBI time slots within each one of the SBI frames; and a plurality of ADSL ports each providing a respective one of a plurality of channels, wherein the overhead byte in each one of the SBI frames includes port identifier bits for identifying each of the ADSL ports and wherein the overhead byte includes back pressure indicator (BPI) bits, each of the BPI bits signifying whether to enable or to disable downstream transmission within one of the channels from the control unit to one of the ports on the line card.

34. The line card of claim 33, wherein the narrowband digital signal bytes are transmitted at a data rate ranging from a data rate for DS1 signals per subscriber channel to a data rate for plain old telephone service (POTS) signals per subscriber channel.

35. The line card of claim 33, wherein the FPGA is further programmed to assign an asymmetrical digital subscriber line (ADSL) identification tag (AIT) byte to one of the SBI time slots in each one of the frames for identifying if the line card is an ADSL line card.

36. The line card of claim 33, wherein the FPGA is programmed to assign the narrowband digital signal byte to a first one of the time slots within each of the SBI frames, and to assign one of the ATM header bytes to the first time slot in each of the SBI frames, wherein the ATM header byte and the narrowband signal byte in the first time slot are bit interleaved.

* * * * *